(12) United States Patent
Kumabe

(10) Patent No.: US 8,666,647 B2
(45) Date of Patent: Mar. 4, 2014

(54) CONVOY TRAVEL APPARATUS

(75) Inventor: Seigou Kumabe, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/614,153

(22) Filed: Sep. 13, 2012

(65) Prior Publication Data

US 2013/0080041 A1    Mar. 28, 2013

(30) Foreign Application Priority Data

Sep. 27, 2011 (JP) ................................. 2011-211070

(51) Int. Cl.
*G06F 19/00* (2011.01)
*G06G 7/70* (2006.01)
*G06G 7/76* (2006.01)
*G08G 1/00* (2006.01)

(52) U.S. Cl.
USPC ........................................................ 701/117

(58) Field of Classification Search
USPC ........................................................ 701/117
See application file for complete search history.

(56) References Cited

U.S. PATENT DOCUMENTS

| 2004/0128062 A1 | 7/2004 | Ogino et al. | |
| 2007/0288132 A1* | 12/2007 | Lam | 701/23 |
| 2008/0009985 A1* | 1/2008 | Plishner | 701/23 |
| 2008/0059007 A1* | 3/2008 | Whittaker et al. | 701/2 |
| 2009/0157461 A1* | 6/2009 | Wright et al. | 705/8 |
| 2010/0268445 A1* | 10/2010 | Chen et al. | 701/119 |

FOREIGN PATENT DOCUMENTS

| JP | 2004-118608 | 4/2004 |
| JP | 2009-239585 | 10/2009 |
| JP | 2010-057015 | 3/2010 |
| JP | 2010-213044 | 9/2010 |

OTHER PUBLICATIONS

U.S. Appl. No. 13/614,005, filed Sep. 13, 2012, Kumabe.
U.S. Appl. No. 13/614,079, filed Sep. 13, 2012, Kumabe.

* cited by examiner

*Primary Examiner* — Fadey Jabr
*Assistant Examiner* — Paula L Schneider
(74) *Attorney, Agent, or Firm* — Harness, Dickey & Pierce, PLC

(57) ABSTRACT

A convoy travel apparatus transmits convoy travel information including a whole convoy ID and a sub-convoy ID when a subject vehicle is in a convoy travel state, and performs a convoy travel control by utilizing the sub-convoy ID. Further, a second vehicle of the whole convoy is a leader vehicle of a sub-convoy and is also a follower vehicle in a forward sub-convoy, thereby (i) determining the convoy travel control of itself by receiving the convoy travel information of the sub-convoy in which the subject vehicle is traveling as the follower vehicle and (ii) transmitting the convoy travel information including the content of the determined convoy travel control. Thus, the follower vehicle in the sub-convoy lead by the subject vehicle performs the convoy travel control based on the convoy travel information from the leader vehicle of the sub-convoy in which the subject vehicle is traveling as the follower vehicle.

6 Claims, 8 Drawing Sheets

STATE B

STATE D

STATE D

CONVOY TRAVEL APPARATUS

CROSS REFERENCE TO RELATED APPLICATION

The present application is based on and claims the benefit of priority of Japanese Patent Application No. 2011-211070, filed on Sep. 27, 2011, the disclosure of which is incorporated herein by reference.

TECHNICAL FIELD

The present disclosure generally relates to an in-vehicle convoy travel apparatus performing a vehicle travel control to organize a convoy travel of vehicles.

BACKGROUND

In a convoy travel of multiple vehicles forming an organized group of vehicles, following vehicles (i.e., "followers") in a convoy which follow a leader vehicle (i.e., a "leader") respectively receive travel information directly from the leader vehicle for performing vehicle travel control and organizing a convoy. Such a technique is disclosed, for example, in Japanese Patent Laid-Open No. 2009-239585 (JP '585). According to such technique, the following vehicles other than an immediate following vehicle (i.e., a right-behind vehicle) of the leader vehicle are also enabled to perform travel control that quickly reflects the travel information of the leader vehicle.

When multiple follower vehicles of the convoy directly receive the travel information transmitted from the leader vehicle of the convoy, the number of vehicles in the convoy is restricted based on the number of vehicles that can be covered by the capacity of the wireless communication unit of the leader vehicle.

SUMMARY

In an aspect, the present disclosure a convoy travel apparatus may be provided in a subject vehicle and other vehicles. The convoy travel apparatus includes a control unit and a wireless communication unit. The control unit generates a convoy travel information and performs a convoy travel control of the subject vehicle. The wireless communication unit performs vehicle-to-vehicle communication, and regularly transmits the convoy travel information of the subject vehicle generated by the control unit and regularly receives a convoy travel information from other vehicles.

The convoy travel information includes a whole convoy ID representing a whole convoy and at least one sub-convoy ID representing a sub-convoy. The sub-convoy is organized by dividing the whole convoy, where each sub-convoy includes a number of vehicles less than or equal to a predetermined value defined by a communication capacity of the wireless communication unit of a sub-convoy leader vehicle of the sub-convoy.

The control unit further determines whether the subject vehicle is a sub-convoy leader vehicle or a sub-convoy follower vehicle of a sub-convoy. When the subject vehicle is the sub-convoy follower vehicle of the sub-convoy, the control unit performs the convoy travel control of the subject vehicle per the convoy travel information received from the sub-convoy leader vehicle of a sub-convoy in which the subject vehicle is traveling as a follower vehicle. The control unit identifies the convoy travel information from the sub-convoy leader vehicle from amongst the all of the convoy travel information received by the wireless communication unit by the sub-convoy ID and the leader information included in the convoy travel information.

When the subject vehicle is the sub-convoy leader vehicle of the sub-convoy, the control unit generates the convoy travel information to further include a leader information for identifying the subject vehicle as a leader of the sub-convoy.

In addition, when the subject vehicle is the sub-convoy leader vehicle of a subsequent sub-convoy to a forward sub-convoy, the control unit, based on the sub-convoy ID and the leader information included in the convoy travel information, identifies the convoy travel information received from the sub-convoy leader vehicle of the sub-convoy in which the subject vehicle is traveling as a sub-convoy follower vehicle. Also, the control unit determines a content of the convoy travel control of the subject vehicle based on the convoy travel information identified, and generates the convoy travel information to further include the content of the convoy travel control. The convoy travel information is transmitted by the wireless communication unit.

In the present disclosure, in addition to transmitting the whole convoy ID representing an identification number of the whole convoy, the apparatus further transmits the sub-convoy ID, thereby enabling the convoy travel control via the sub-convoy ID. The number of vehicles in the sub-convoy has a value that is defined by the communication capacity of the wireless communication unit of the leader vehicle of the sub-convoy. That is, a maximum allowable number of vehicles in a certain sub-convoy is defined by the communication capacity of the wireless communication unit of the leader vehicle of the certain sub-convoy. Therefore, the sub-convoy follower vehicle(s) of the certain sub-convoy may receive the convoy travel information from the leader vehicle of the certain sub-convoy, for performing the convoy travel control.

Further, the sub-convoy leader vehicle of the second or subsequent sub-convoy is also a follower vehicle of a preceding sub-convoy. Therefore, the sub-convoy leader vehicle of the subsequent sub-convoy determines the content of the convoy travel control of the subsequent sub-convoy by receiving the convoy travel information from a sub-convoy leader vehicle of the preceding sub-convoy. The sub-convoy leader vehicle of the subsequent sub-convoy may transmit the content of the convoy travel control from the preceding sub-convoy by including such content in the convoy travel information to be transmitted via the wireless communication unit. Thus, a follower vehicle(s) of the subsequent sub-convoy can respectively perform the convoy travel control based on the convoy travel information of the preceding sub-convoy, thereby a convoy can be organized to have, included therein, a number of vehicles beyond the capacity of the leader vehicle of the whole convoy.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Figure 1:
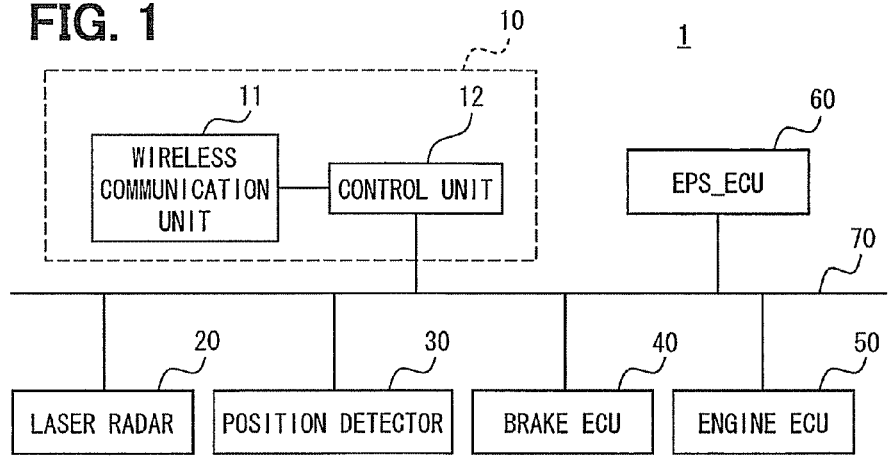
FIG. 1 is a block diagram of an in-vehicle convoy travel system including a convoy travel apparatus of the present disclosure.

The present disclosure is described in the following with reference to the drawings. FIG. 1 is a block, diagram of an in-vehicle convoy travel system 1 including a convoy travel apparatus 10. The in-vehicle convoy travel system 1 is disposed in a subject vehicle, and where multiple vehicles each having the in-vehicle convoy travel system 1 organize a convey of travel vehicles with the in-vehicle convoy travel system 1 (i.e., a travel of many vehicles organized as a convoy).

In addition to the convoy travel apparatus 10, the in-vehicle convoy travel system 1 includes a laser radar 20, a position detector 30, a brake ECU 40, an engine ECU 50, and an EPS_ECU 60, which are communicably coupled via a local area network (LAN) 70 based on a communication protocol such as a Controller Area Network (CAN).

The convoy travel apparatus 10 includes a wireless communication unit 11 and a control unit 12. The wireless communication unit 11 has a transmission and reception antenna (not illustrated), and, for example, wirelessly performs a vehicle-to-vehicle communication in a communication range of, for example, several hundred meters around the subject vehicle. Further, the electric wave used by the wireless communication unit 11 may be in a 700 MHz band. However, the wireless communication unit 11 may use other frequency bands such as 5.9 GHz. Further, information from the subject vehicle is broadcasted through a unidirectional communication (i.e., one-way communication).

The control unit 12 includes a well-known CPU and memories, such as ROM, RAM, EEPROM, as well as an input/output and a bus line (not illustrated) to coupled the components of the control unit 12. The control unit 12 performs a convoy travel control by controlling the brake ECU 40, the engine ECU 50, and the EPS_ECU 60, based on information acquired from other vehicles through the wireless communication unit 11 and based on information acquired from the laser radar 20, the position detector 30, the brake ECU 40, the engine ECU 50, and the EPS_ECU 60 via the in-vehicle LAN 70 of the subject vehicle.

Further, the control unit 12 functions as a communication controller by controlling transmission and reception of information transmitted and received by the wireless communication unit 11. Under control of the control unit 12, the wireless communication unit 11 transmits convoy travel information, i.e., information of the subject vehicle, which is used respectively by other vehicles in the convoy for the convoy travel control of the vehicles. Furthermore, the control unit 12 performs a process that identifies a sender of the convoy travel information received by the wireless communication unit 11. Details of such process by the control unit 12 are described later.

The laser radar 20 is installed on a front end of the vehicle, and scans a front object in front of the vehicle by emitting a laser beam in a comparatively small predetermined angle range. The front object is detected based on an intensity of a reflection beam from the object above a predetermined level. Further, based on the emission direction of the laser beam, a relative direction of the front object is detected, and, based on the time between the emission and the reception of the laser beam, the distance to the front object is also detected. Further, the laser radar 20 performs a determination whether the front object is a forward vehicle that travels right in front of the subject vehicle (i.e., immediately ahead of the subject vehicle). Therefore, the laser radar 20 can regularly measure a distance from the subject vehicle to the leader vehicle. Further, the laser radar 20 may be replaced with a millimeter wave radar. Further, the control unit 12, instead of the radar 20, may perform a determination whether or not the front object is a forward vehicle.

The position detector 30 includes a Global Positioning System (GPS) receiver receiving the electric wave from a satellite of GPS, and regularly detects coordinates (i.e., GPS positioning coordinates hereinafter) of a position of the subject vehicle based on the electric wave received by the GPS receiver.

The brake ECU 40 uses a microcomputer as its main component, which includes CPU, ROM, RAM, backup RAM and the like, and acquires, for example, a signal indicating a vehicle speed, a forward/backward acceleration, and a lateral acceleration from a vehicle speed sensor and an acceleration sensor, and supplies the signal to the control unit 12. Further, based on instructions from the control unit 12, the brake ECU 40 controls brake actuators to control a vehicle speed (e.g., reduce vehicle speed).

The engine ECU 50 controls an engine torque generated by an engine (not illustrated) to accelerate and decelerate the subject vehicle based on instructions from the control unit 12. The EPS_ECU 60 acquires, a signal indicating a steering torque and a steering angle from a torque sensor and a steering angle sensor, and supplies those signals to the control unit 12. Based on instructions from the control unit 12, the EPS_ECU 60 controls a motor that rotates a steering shaft of the subject vehicle.

The convoy travel control performed by the control unit 12 is described in detail. First, explanation of a basic concept of the convoy travel control in the present embodiment is provided with reference to FIG. 2. The convoy travel control in the present embodiment is performed according to four states of the subject vehicle: an initial state (State A), a convoy ready state (State B), a convoy enabling state (State C), and a convoy travel state (State D). The control, unit 12 changes and keeps track of a state parameter that represents one of four states of the subject vehicle.

The processes performed in the four states are described in the following. Each vehicle, i.e., the subject vehicle and other vehicles, starts with the initial state (State A). Further, the vehicle (i.e., a control state of a vehicle) may transition to the initial state (State A) from each of the other states, that is, from the convoy ready state (State B), the convoy enabling state (State C), and the convoy travel state (State D).

Figure 3:
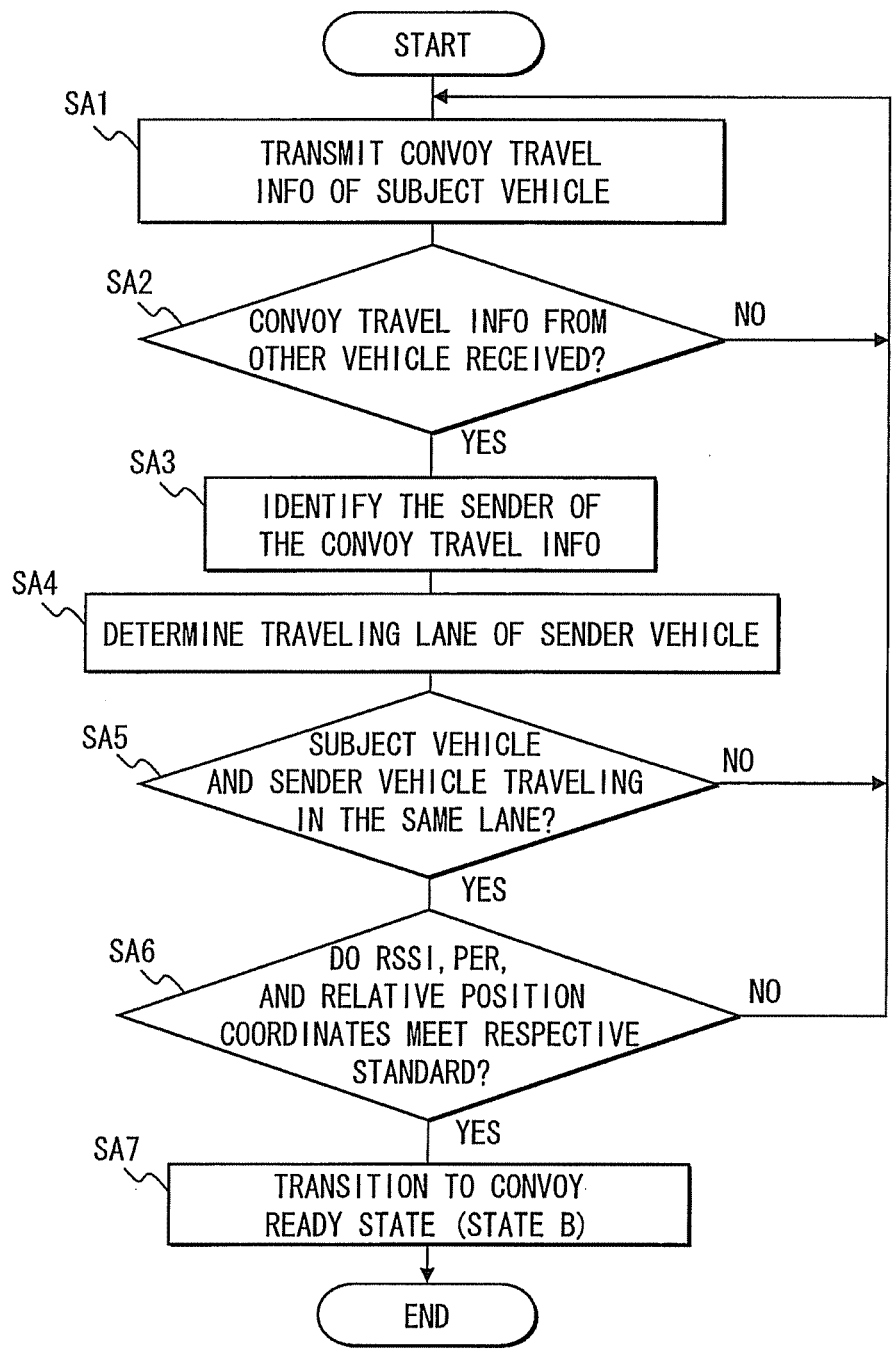
FIG. 3 is a flowchart of a process that is performed in an initial state (State A) by the convoy travel apparatus.

When the subject vehicle is in the initial state (State A), it performs a process shown in FIG. 3. The subject vehicle, in SA1, transmits a convoy travel information of the subject vehicle from the wireless communication unit 11. The convoy travel information includes a predetermined number, such as four latest measurements of successively observed GPS positioning coordinates, as well as, vehicle speed and travel direction. Further, the convoy travel information may include information of the travel control and/or travel behaviors of the subject vehicle (e.g., information about the brake control). The GPS positioning coordinates are regularly acquired from the position detector 30, and the vehicle speed is acquired from the vehicle speed sensor through the brake ECU 40. The direction may be calculated from the locus of GPS positioning coordinates, or may be acquired from a geomagnetism sensor if the subject vehicle is equipped with one.

Though not included in the convoy travel information of the initial state (State A), the convoy travel information of the convoy travel state (State D) may include a whole convoy ID and a sub-convoy ID, as described later, and the convoy travel information may further include a currently-included number of vehicles and the maximum number of vehicles in the convoy.

In SA2, the process determines whether convoy travel information from another vehicle has been received. If one or more vehicles around the subject vehicle are equipped with the in-vehicle convoy travel system 1, the subject vehicle receives the convoy travel information from such vehicles (i.e., other vehicles) because those vehicles can transmit the convoy travel information. If convoy travel information was not received from the other vehicle (SA2, No) the process returns to SA1. If convoy travel information was received (SA2,YES), the process proceeds to SA3. The other vehicle that transmitted the convoy travel information received by the subject vehicle is referred to as a sender vehicle hereinafter.

In SA3, the process identifies the sender vehicle that transmitted the convoy travel information received in SA2. Specifically, the process generates a travel locus of the sender vehicle from multiple measurements of GPS positioning coordinates included in the convoy travel information from the sender vehicle. The process then compares the generated travel locus with a past travel locus generated from the convoy travel information that was previously received prior to the reception of the convoy travel information currently received and is stored in memory. Based on the matching degree of two travel loci, the process identifies the sender vehicle of the convoy travel information currently-received. Further, when performing a convoy travel, convoy travel information is received from each of the multiple vehicles regularly. From among all the convoy travel information received, the past travel locus used in the above comparison has at least one measurement time that is the same as the GPS positioning coordinates as the current travel locus. That is, the current travel locus and the past travel locus are chosen to have substantially the same measurement time except for the end point of the travel locus. Such situation is described in detail in the following.

Figure 4:
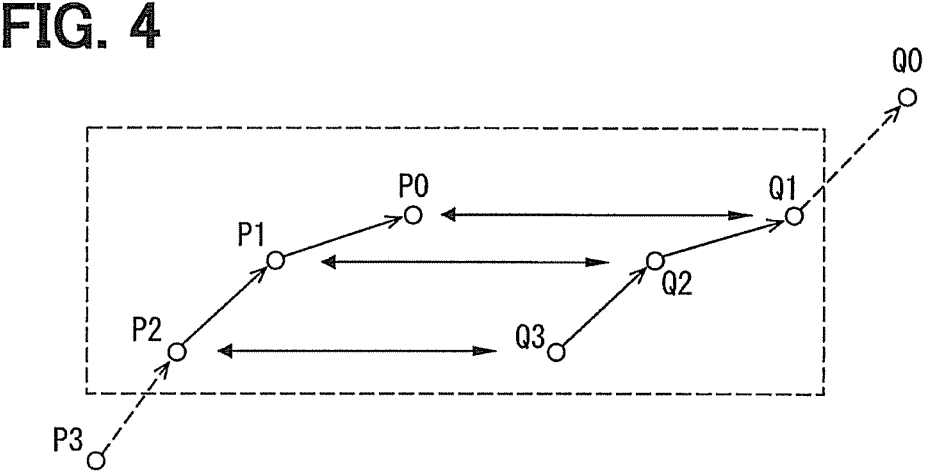
FIG. 4 is an illustration of a comparison method of travel loci of two vehicles.

With reference to FIG. 4, the comparison method of two travel loci respectively having four measurement points is described in the following. The past travel locus used for comparison is made up from three points, excluding the oldest measurement point from the four successively measured points. The three GPS positioning coordinate points used for comparison are P2, P1, P0. The current travel locus used for comparison is also made up from three points, the GPS positioning coordinate points of Q3, Q2, Q1 of FIG. 4, excluding the latest measurement point. If the GPS positioning coordinate points P0 to P3 and Q0 to Q3 are based on the information successively transmitted from the same vehicle, the points P0 and Q1, the points P1 and Q2, the points P2 and Q3 respectively represent the same GPS positioning coordinate points of the same vehicle measured respectively at the same time, as indicated by both-headed arrows in FIG. 4. Therefore, as circled by a dotted line square in FIG. 4, a travel locus P2-P1-P0 and a travel locus Q3-Q2-Q1 substantially match with each other if they are from the same vehicle. If, on the other hand, two loci are from different vehicles, the matching degree of two loci is less.

Therefore, based on the matching degree of two travel loci, the position of the sender vehicle of the convoy travel information currently-received can be identified. The matching degree mentioned above represents both of the degree of matching of two travel locus shapes as well as the degree of matching of two travel locus positions. Therefore, by regularly identifying the sender vehicle based on the travel locus, the sender vehicle transmitting the convoy travel information is identified in terms of its whereabouts in the past (i.e., its travel locus history), even when the latest GPS positioning coordinate points respectively received from the multiple vehicles around the subject vehicle are very close to each other (i.e., even when one travel locus and the other are very similar at one measurement points or another). Further, when it is determined that the degree of matching of a travel locus with any one of the past travel loci is below a certain level, such vehicle is determined as a newly-joining vehicle just recently coming into the communication area of the subject vehicle.

With continuing reference to FIG. 3, in SA4, based on the GPS positioning coordinates of both vehicles and independent sensor information, the process determines whether the sender vehicle identified in SA3 is traveling in the same lane as the subject vehicle. For instance, when it is determined (i) that the sender vehicle is in front of the subject vehicle at or within a predetermined distance based on the GPS positioning coordinates and (ii) based on the detection of the laser radar 20 it is determined that a vehicle, substantially within the predetermined distance, is right-ahead of or immediately ahead of the subject vehicle, the subject vehicle and the sender vehicle are determined to be traveling in the same lane.

When the determination in SA4 is that the subject vehicle and the sender vehicle are traveling in the same lane, SA5 is YES and the process proceeds to SA6. Otherwise SA5 is NO, and the process returns to SA1.

In SA6, the process determines whether a reception signal strength (RSSI) and packet error rate (PER) of the convoy travel information received in SA2 from the sender vehicle respectively satisfy a certain standard for each of those indices. Specifically, when the RSSI is greater than a RSSI threshold, it is determined to satisfy the standard, and, when the PER is less-than or equal to a PER threshold, it is determined to satisfy the standard. It is preferred to have a higher RSSI and a lower PER.

The process also determines whether relative position coordinates satisfy a certain standard. The relative position coordinates are calculated as coordinate differences between the latest positions of the subject vehicle and the sender vehicle. When a distance represented by the coordinate differences is equal to or under a threshold standard distance, the relative position coordinates are determined as satisfying the standard.

If the RSSI, the PER, and the relative position coordinates satisfy respective standards, the process in SA6 is determined as affirmative, which indicates that a vehicle close to the subject vehicle is transmitting the convoy travel information, and the information transmitted from the vehicle is received in a high reception quality.

When the process in SA6 is determined as affirmative, the process proceeds to SA7. On the other hand, when the process in SA6 is determined as negative, that is, when at least one of the RSSI, the PER, and the relative position coordinates is not a standard, the process returns to SA1.

Figure 5:
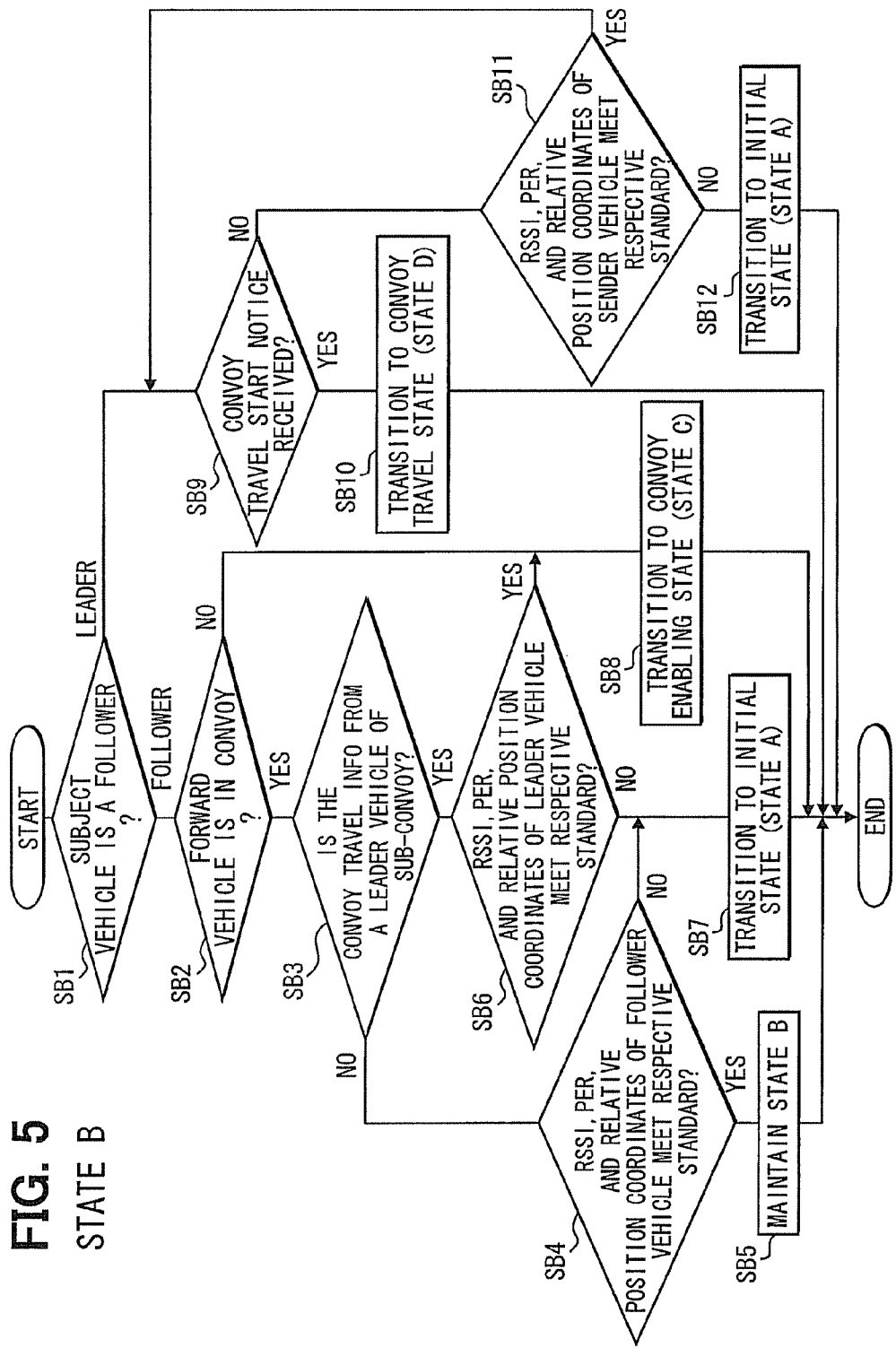
FIG. 5 is a flowchart of a process performed in a convoy ready state (State B) by the convoy travel apparatus.

In SA7, the state parameter is changed to the convoy ready state (State B). After transiting to the convoy ready state (State B) by the execution of SA7, a process shown in FIG. 5 is performed.

Figure 2:
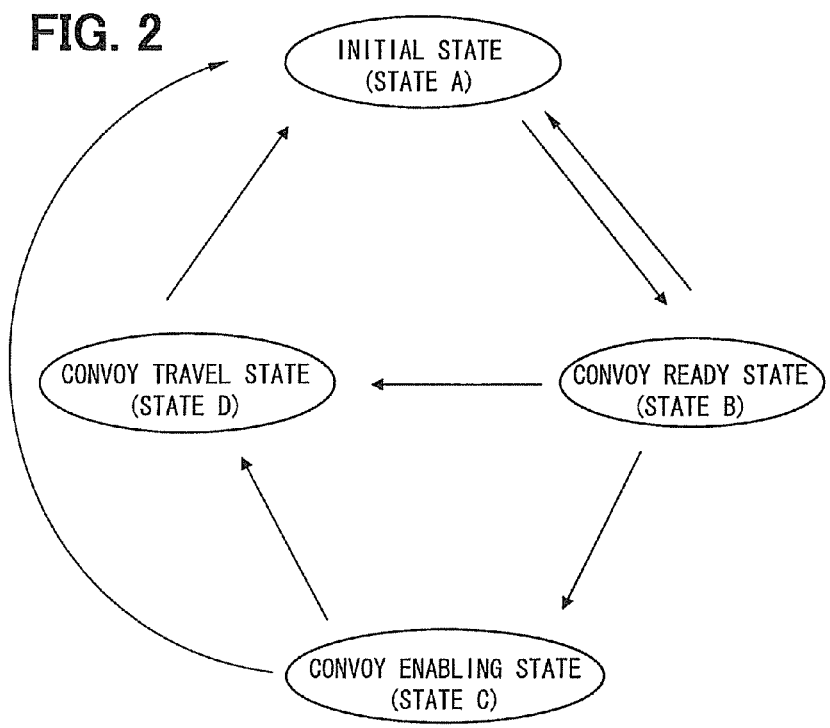
FIG. 2 is a state transition diagram of convoy travel control.

The process executed in the convoy ready state (State B) is described with reference to FIG. 5. The subject vehicle can transition to the convoy ready state (State B) only from the initial state (State A) as shown in FIG. 2, and, when the subject vehicle transitions from the initial state (State A) to the convoy ready state (State B), the subject vehicle should not be in any convoy and the subject vehicle, which is joining a convoy, has identified at least one sender vehicle. The subject vehicle may be referred to as the joining vehicle hereinafter.

A convoy can be organized by the joining vehicle and the sender vehicle in either case that the joining vehicle leads (i.e., is in front of) the sender vehicle or the sender vehicle leads the joining vehicle. Therefore, whether to transition from the initial state (State A) to the convoy ready state (State B) is determined without identifying which one of the joining vehicle and the sender vehicle is in front of the other. However, the process of organizing a convoy is respectively different when the joining vehicle leads the sender vehicle and when the sender vehicle leads the joining vehicle.

Therefore, in SB1, the process determines whether the joining vehicle (i.e., the subject vehicle) is following the sender vehicle. Such determination is performed based on the latest GPS positioning coordinates of the joining vehicle and the GPS positioning coordinates of the sender vehicle, which are included in the convoy travel information received from the sender vehicle.

When the GPS positioning coordinates of the joining vehicle are behind the travel direction of the GPS positioning coordinates of the sender vehicle, it is determined that the joining vehicle is following the sender vehicle (i.e., the subject vehicle will be traveling as a follower vehicle in the convoy), and the process proceeds to SB2.

When the GPS positioning coordinates of the joining vehicle are in front of the travel direction of the GPS positioning coordinates of the sender vehicle, it is determined the joining vehicle will become a leader vehicle in a convoy, and the process proceeds to SB9.

When the subject vehicle (i.e., the joining vehicle) is a follower vehicle of the sender vehicle, the process in SB2, determines whether the sender vehicle (i.e., a forward vehicle in the following) is traveling in a convoy. The convoy travel information from the forward vehicle may include a whole convoy ID. Based on the inclusion of such ID in the convoy travel information, the determination in SB2 is performed. Thus, if the convoy travel information of the forward vehicle includes the whole convoy ID, the forward vehicle is in a convoy (SB2, YES), and the process proceeds to SB3, and if the convoy travel information does not include the whole convoy ID, the forward vehicle is not in a convoy (SB2, NO), and the process proceeds to SB8.

When SB3 is performed, the forward vehicle is provided as a rearmost vehicle traveling in the convoy. In the present embodiment, the convoy is organized by not only using the behavior of a right ahead vehicle (i.e., a vehicle traveling immediately in front of the subject vehicle) but also using the information transmitted by a sub-convoy leader vehicle (i.e., a leader of the sub-convoy). Therefore, in SB3, it is determined whether the convoy travel information is received from a leader vehicle of the sub-convoy.

In the present embodiment, contents of the convoy travel information from a leader vehicle of the sub-convoy and a follower vehicle in the sub-convoy provide respectively different information. For instance, the convoy travel information from the leader vehicle of the sub-convoy includes the maximum allowable number of vehicles in the convoy and the currently-included number of vehicles in the convoy. Therefore, whether the convoy travel information is from the leader vehicle of the sub-convoy is determined based on the inclusion of such information (i.e., the maximum allowable number and the currently-included number of vehicles) in the convoy travel information. Accordingly if the convoy travel information includes the maximum allowable number and the currently-included number of vehicles, the convoy travel information is from the leader vehicle (S3:Yes), and the process proceeds to SB6. If such information is not included, the convoy travel information is not from the leader (SB3, NO), but from a follower vehicle in the sub-convoy and the process proceeds to SB4.

In SB4, the process determines whether the RSSI, the PER, and the relative position coordinates from the follower vehicle of the sub-convoy satisfy the respective standards. Such determination is performed for the purpose of determining whether to further maintain the convoy ready state (State B).

When all of the RSSI, the PER, and the relative position coordinates satisfy the standards (SB4, YES), the process proceeds to SB5. Then, in SB5, it is determined to further maintain the convoy ready state (State B). In such case of further maintaining the convoy, the process thereafter returns to SB1. On the other hand, if at least one of the RSSI, the PER, and the relative position coordinates do not satisfy the standards (SB4, NO) the process proceeds to SB7.

When the convoy travel information is from the leader (SB3. YES), the process proceeds to SB6 and determines whether the RSSI, the PER, and the relative position coordinates in the convoy travel information from the leader vehicle of the sub-convoy satisfy the respective standards. If the RSSI, the PER, and the relative position coordinates satisfy the respective standards (SB6, YES), the process proceeds to SB8, and if no (SB6, NO), the process proceeds to SB7.

In SB7, the state parameter is changed to the initial state (State A). In such case, the process in FIG. 3 is performed.

In SB8, the process changes the state parameter to the convoy enabling state (State C). The state parameter is changed to the convoy enabling state (State C) when the subject vehicle is a follower vehicle of the sender vehicle (i.e., forward vehicle). If the forward vehicle of the subject vehicle is traveling in a convoy, the state parameter is changed to the convoy enabling state (State C) only when the convoy travel information from the leader vehicle of the sub-convoy is received in a high reception quality. The convoy enabling state (State C) is provided in FIG. 6.

When the process in SB1 determines that the subject vehicle is a leader vehicle in SB1, then, in SB9, the process determines whether a convoy travel start notice has been received from a following vehicle. The convoy travel start notice is a notice sent by the following vehicle in SC7 of FIG. 6 indicating that the following vehicle is following the subject vehicle (i.e., forward vehicle) and has started the convoy travel. When it is determined to have received the convoy travel start notice, the process proceeds to SB10.

In SB10, the process changes the state parameter to the convoy travel state (State D) indicating that the subject vehicle is traveling in a convoy. In other words, when the subject vehicle is a leader vehicle of a convoy and receives the convoy travel start notice from a following vehicle, the subject vehicle transitions to the convoy travel state (State D).
[0055]
When a convoy travel start notice has not been received, the process in SB11, just like SA6 of FIG. 3, determines whether the RSSI, the PER, and the relative position coordinates of the latest convoy travel information received from the sender vehicle satisfy the respective standards. Such determination is performed for the purpose of determining whether the convoy ready state (State B) should/can be further maintained. When all of the RSSI, the PER, and the relative position coordinates satisfy the standards (SB11, YES), the process returns to SB9. On the other hand, when at least one parameter does not satisfy the standard (SB11, NO), the process proceeds to SB12.

In SB12, the process changes the state parameter to the initial state (State A). In such case, the process mentioned above with reference to FIG. 3 will be performed.

Figure 6:
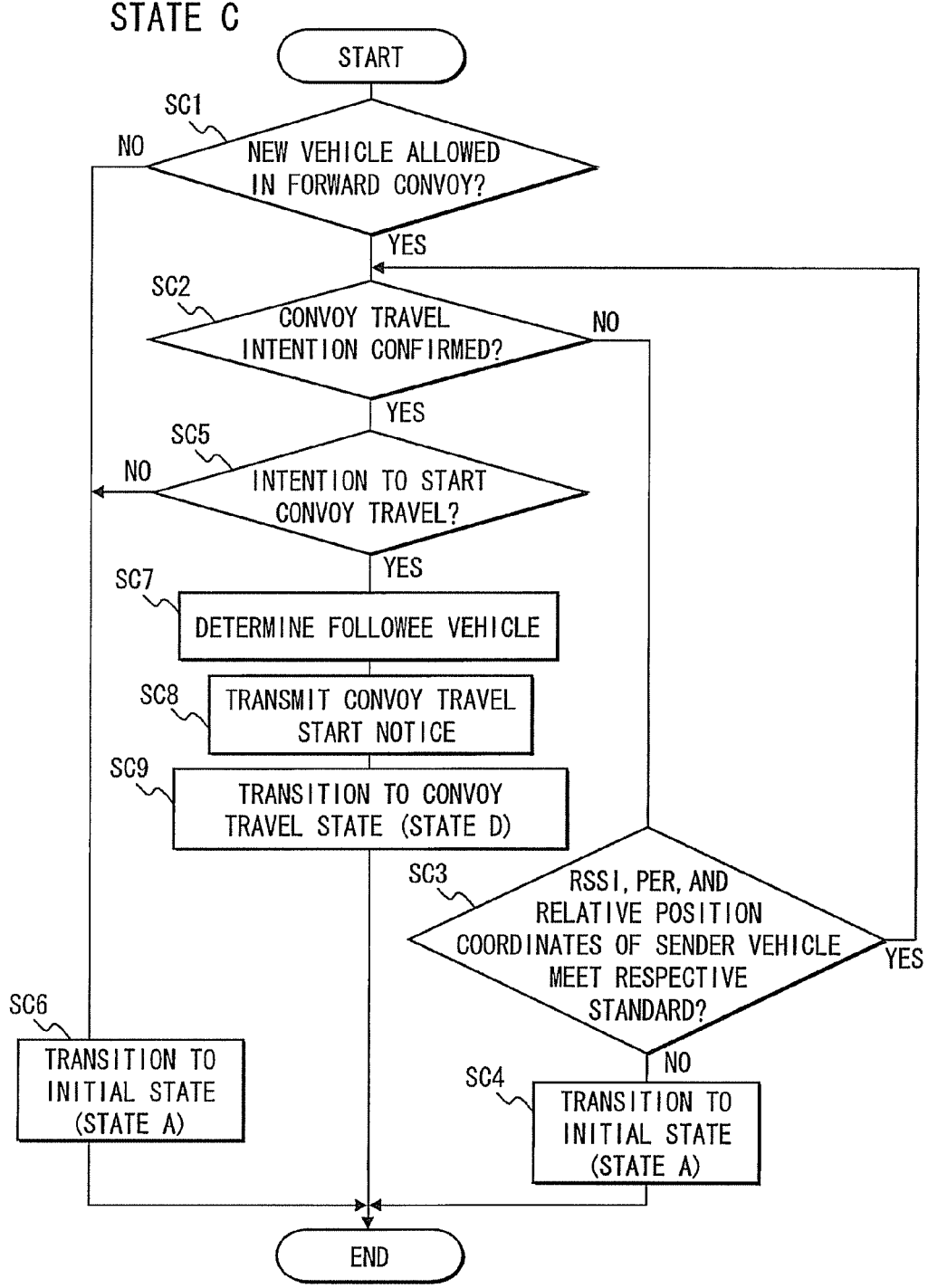
FIG. 6 is a flowchart of a process performed in a convoy enabling state (State C) by the convoy travel apparatus.

With reference to FIG. 6, the process executed in the convoy enabling state (State C) is described. According to the convoy ready state (State B), when the subject vehicle is the following vehicle, the subject vehicle can transition to the convoy enabling state (State C). While the subject vehicle is in the convoy enabling state (State C), the driver receives acknowledgement that the vehicle is enabled to travel in a convoy, either continuously or periodically. More practically, such acknowledgement of enablement of the convoy travel provided for the driver may, for example, appear on a display device positioned in a sight of the driver.

In SC1, the process determines whether a convoy traveling in front of the subject vehicle has room for accommodating a new vehicle. In other words, whether or not the maximum allowable number of the convoy has been reached is determined. Such determination may be made a number of ways. For instance, the subject vehicle may transition to the convoy enabling state (State C), when the forward vehicle is not in a convoy (SB2 of FIG. 5 is NO), in which case the forward vehicle is traveling solo, leading to the determination that the maximum allowable number has not been reached.

Figure 7:
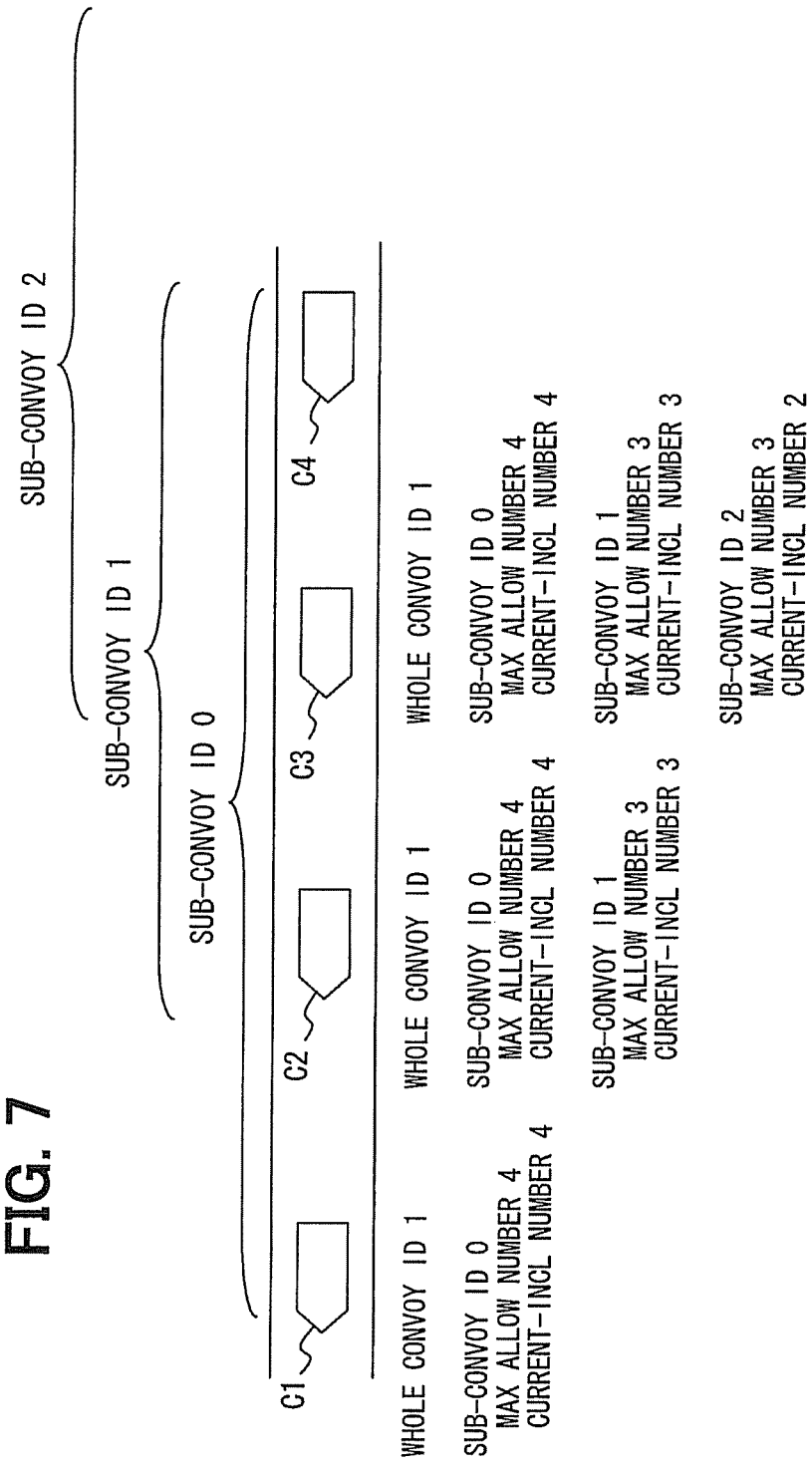
FIG. 7 is an illustration of a part of convoy travel information transmitted from each of the vehicles in the convoy in a convoy travel state (State D)

Also, the subject vehicle may transition to the convoy enabling state (state C), when the RSSI. PER, and the relative position coordinates of the leader is okay (SB6 of FIG. 5 is YES), in which case the information from the leader vehicle of the sub-convoy was received in high reception quality. The leader vehicle of such sub-convoy transmits convoy travel information that includes the maximum allowable number and the currently-included number of vehicles in the vehicle, as shown in FIG. 7. Thus, based on the maximum allowable number and the currently-included number of vehicles in the received convoy travel information from the leader vehicle of the sub-convoy, it is determined whether the sub-convoy has room for a new vehicle. Further, if the convoy travel information is received from two or more leader vehicles of sub-convoys, the determination in SC1 is affirmative upon determining that at least one of multiple leader vehicles is transmitting the convoy travel information indicating a new vehicle is allowed.

When it is determined in SC1 that there is no room for a new vehicle, no vehicle can join the convoy traveling in front of the subject vehicle (SC1, NO). Therefore, the process proceeds to SC6, and finishes the convoy enabling state (State C), and the vehicle transitions to the initial state (State A). On the other hand, the process proceeds to SC2 when it is determined that there is room for a new vehicle in the convoy (SC1, YES).

In SC2, the process determines whether the driver's intention regarding the convoy travel has been confirmed. More practically, it is determined whether the driver has performed a convoy travel start instruction operation (e.g., a convoy travel start button is pressed) or whether the driver has performed a convoy travel refusal instruction operation. When the driver has issued the convoy travel start instruction (SC2, YES), the process proceeds to SC5, and when the convoy travel refusal instruction operation is issued (SC2, NO), the process proceeds to SC3.

SC3 determines whether the RSSI, the PER, and the relative position coordinates in the convoy travel information received from the sender vehicle satisfy the respective standards, just like SB11 of FIG. 5. Such determination is to determine whether the convoy enabling state (State C) should be further maintained. When the RSSI, the PER, and the relative position coordinates all satisfy the standards (SC3, YES), the process returns to SC2. On the other hand, when at least one of the above does not satisfy the standard (SC3, NO), the process proceeds to SC4.

In SC4, the process changes the state parameter to the initial state (State A). In such case, the process in FIG. 3 is performed.

When the convoy travel intention of the driver has been confirmed in SC2, the process proceeds to SC5. In SC5, the process determines whether the driver's intention of the convoy travel confirmed in above-mentioned SC2 is an intention to start the convoy travel or a refusal. If such determination in SC5 is negative, that is, if the driver's intention was the refusal of the convoy travel, the process proceeds to SC6. In SC6, the process changes the state parameter to the initial state (State A). In such case, the process in FIG. 3 is performed.

On the other hand, the process proceeds to SC7 when the intention is to start convoy travel (SC5, Yes). In SC7, the process determines a right ahead vehicle (i.e., immediate ahead vehicle) as a followee vehicle, followed by the subject vehicle. Further, which vehicle is the right ahead vehicle is determined based on the identification result in SA3. Alternatively, the sender vehicle may also be identified in SC7 in the same manner as SA3. In SC8, the process transmits the convoy travel information that includes the convoy travel start notice. The followee vehicle (i.e., the vehicle followed by the subject vehicle) can identify that the vehicle transmitting the convoy travel start notice is a right behind vehicle based on the predetermined number of GPS positioning coordinates included in the convoy travel information.

The process proceeds to SC9 after having transmitted the convoy travel start notice in SC8, and the process changes the state parameter to the convoy travel state (State D).

The process executed in the convoy travel state (State D) is described in the following. FIG. 7 illustrates the convoy travel information transmitted by each vehicle in the convoy travel state (State D). More practically, the contents of the convoy travel information transmitted by each vehicle in the convoy travel state (State D) as well as how to organize a sub-convoy.

FIG. 7 shows a state that a convoy is traveling toward the left side of FIG. 7, and a vehicle C1 is the leader vehicle of the whole convoy.

The leader vehicle C1 of the whole convoy generates a whole convoy ID and transmits the generated whole convoy ID by controlling the convoy travel information to include such whole convoy ID. Further, for illustration purposes, the whole convoy ID is designated as "1" in the present embodiment. However, the actual ID may be a more complicated number. [0067]

Further, the leader vehicle C1 of the whole convoy is the leader vehicle of the first sub-convoy, and it generates a sub-convoy ID 0. The convoy travel information is transmitted with such sub-convoy ID as well as the maximum allowable number and the sub-convoy ID included therein.

The maximum allowable number is the number of vehicles allowable or to be included in the sub-convoy in which the subject vehicle is serving as the leader vehicle. The maximum allowable number counts the subject vehicle itself in the number. The maximum allowable number is a predetermined number determined according to the capacity of the wireless communication unit 11 of the subject vehicle. For example, when the capacity of the wireless communication unit 11 of the subject vehicle allows communication with three vehicles behind the subject vehicle, the maximum allowable number is set to 4, since the number includes the subject vehicle itself. The currently-included number of vehicles is incremented by 1 when the subject vehicle receives the convoy travel start notice from a vehicle that has newly joined the convoy to follow the subject vehicle.

The second vehicle C2 of the whole convoy becomes the following vehicle in the sub-convoy having the sub-convoy ID 0. Therefore, the convoy travel information transmitted from the vehicle C2 includes the whole convoy ID, the sub-convoy ID 0, the maximum allowable number and the currently-included number of vehicles of the sub-convoy. Further, in the present embodiment, the leader vehicles of the sub-convoys are successively arranged, next to each other. In other words, the second vehicle C2 of the whole convoy is also the leader vehicle of the second sub-convoy, which is next to the first sub-convoy in which the vehicle C1 serves as the leader vehicle. Therefore, the convoy travel information from the vehicle C2 further includes the sub-convoy ID 1 in which the vehicle C2 serves as the leader vehicle. Further, the convoy travel information from the vehicle C2 further includes the maximum allowable number and the currently-included number of vehicles of such sub-convoy ID 1, since the vehicle C2 is the leader vehicle of the sub-convoy ID 1. In the example of FIG. 7, since the maximum allowable number is 3, the sub-convoy having the sub-convoy ID 1 allows at most 3 vehicles in the sub-convoy.

The third vehicle C3 of the whole convoy becomes the following vehicle in both of two sub-convoys having the sub-convoy IDs of 0 and 1. Therefore, the convoy travel information from the third vehicle C3 includes the whole convoy ID, the sub-convoy IDs of 0, 1, and the maximum allowable numbers and the currently-included numbers of those two sub-convoys. Further, the convoy travel information from the vehicle C3 further includes the sub-convoy ID 2 because the vehicle C3 is the leader vehicle of the third sub-convoy. In addition, the convoy travel information from the vehicle C3 further includes the maximum allowable number and the currently-included number of vehicles of the third sub-convoy, since the vehicle C3 is the leader vehicle of the third sub-convoy. In the example of FIG. 7, the maximum allowable number is 3. Further, since the sub-convoy having the sub-convoy ID 2 includes the vehicle C3 and one following vehicle C4 only, the currently-included number of the sub-convoy having the sub-convoy ID 2 is 2.

The process executed in the convoy travel state (State D) is described with reference to FIG. 8 in the following. When the subject vehicle is a following vehicle, the subject vehicle may transition to the convoy travel state (State D) from SC9 of FIG. 6. When the subject vehicle is a forward vehicle, the subject vehicle may transition to the convoy travel state (State D) from SB10 of FIG. 5.

At first, in SD1, the subject vehicle determines whether the subject vehicle itself is the leader vehicle of the whole convoy. When it is determined that the subject vehicle is the leader vehicle of the whole convoy, the process proceeds to SD2, and, when it is determined that the subject vehicle is a following vehicle of the whole convoy (i.e., a vehicle except the leader vehicle), the process proceeds to SD3.

In SD2, the process generates and transmits convoy travel information. The convoy travel information includes the whole convoy ID, the sub-convoy ID, the currently-included number, the maximum allowable number, as well as the convoy travel information from the initial state (State A), that is, the travel information of the subject vehicle.

Among the above-described information included in the convoy travel information, the whole convoy ID is generated at a first execution time of SD2 after the formation of the convoy, and the generated whole convoy ID is re-used thereafter. The whole convoy ID is generated according to a generation rule that controls the ID to have a different number at each time of generation and to have at least a predetermined, number of digits, for the improvement of security and for preventing, as much as possible, the mix up with the ID assigned to the other convoy. For example, the ID may be generated based on coordinates at a time of starting the convoy travel, a time of starting the convoy travel, a randomly generated text string, and/or a combination of those numbers and strings.

Unlike the whole convoy ID, the sub-convoy ID is generated as a simple number for the ease of understanding that at what number of order the sub-convoy currently is in the whole convoy. In the present embodiment, the first sub-convoy ID is 0, and the ID is sequentially incremented by 1. Therefore, the sub-convoy ID generated in SD2 is 0. This concludes the explanation of SD2. The process then proceeds to SD7 to be described later after processing in SD2.

In SD3, it is determined whether the subject vehicle is the leader vehicle of the sub-convoy. More practically, the process in SD3 determines whether the subject vehicle is the leader vehicle of the second or further subsequent sub-convoy of the whole convoy, because SD3 is performed when the subject vehicle is not the leader vehicle of the whole convoy. Further, when SD10 is performed, which is described later, the subject vehicle recognizes that it is the leader vehicle of a convoy. When the determination in the subject vehicle is a leader of sub-convoy (SD3, Yes), the process proceeds to SD11, and, when the subject vehicle is not a leader of sub-convoy (SD3, No), the process proceeds to SD4.

When SD4 is performed, it is already determined that the subject vehicle is a following vehicle in a sub-convoy and the subject vehicle is not a leader vehicle of any sub-convoy. In SD4 the subject vehicle receives convoy travel information from multiple vehicles (i.e., other vehicles) in the convoy. The subject vehicle may also receive the convoy travel information from a vehicle outside of the convoy if such vehicle is traveling around the subject vehicle. However, in the present embodiment, the sub-convoy is a unit of performing the convoy travel control. Therefore, the subject vehicle performs the convoy travel control for itself based on the convoy travel information of the leader vehicle of the sub-convoy to which the subject vehicle belongs as a following vehicle.

Therefore, in SD5, the process identifies the convoy travel information of the leader vehicle of the sub-convoy, which is considered as a unit of convoy travel control by the subject vehicle, from among many sets of convoy travel information respectively received from multiple vehicles. Further, as illustrated above with reference to FIG. 7, each of the sub-convoys in the present embodiment is arranged to have its leader vehicle traveling next to each other in succession. Therefore, the subject vehicle performs the convoy travel control for itself based on the convoy travel information from the leader vehicle of a sub-convoy, which is identified as the one to which the subject vehicle belongs, by checking the sub-convoy IDs even when the convoy travel information is possibly received from many leader vehicles of sub-convoys. That is, the leader of the sub-convoy for the subject vehicle is the leader of the sub-convoy ID having the smallest value among all the other sub-convoy Ds that respectively has the currently-included number of vehicles (including the subject vehicle) not exceeding the maximum allowable number.

In the example of FIG. 7, the vehicle C3 receives the convoy travel information from two leader vehicles of the sub-convoys respectively having the sub-convoy ID 0 and the sub-convoy ID 1. In such case, the convoy travel information of the leader vehicle having the sub-convoy ID 0, i.e., the vehicle C1, is considered as the one to be used by the subject vehicle (i.e., the vehicle C3) for performing the convoy travel control. However, the behavior of the vehicle C2 should also be considered for performing the convoy travel control, because the vehicle C2 is a forward vehicle of the vehicle C3 in the sub-convoy having the sub-convoy ID 0. Therefore, the vehicle C3 also identifies the convoy travel information of the vehicle C2.

The identification of the convoy travel information of the vehicle C2 is performed in the following manner. A travel locus is generated for each of the convoy travel information received, which respectively include the predetermined number of measurements of the GPS positioning coordinates. Based on a comparison between each of travel loci generated and a past travel loci generated from the memory-stored convoy travel information, a positional relationship with each sender vehicles, which respectively sent the convoy travel information in and out of the convoy is identified.

Based on such identification, the convoy travel information received is associated either with an immediate front vehicle, a vehicle one further in the forward direction, or the like. Therefore, based on such identification result and at what number of order the subject vehicle is in the sub-convoy, the convoy travel information of the leader vehicle of the sub-convoy is identified, which is required for the subject vehicle to perform the convoy travel control for itself. In such case, the predetermined number of measurements of GPS positioning coordinates transmitted from the leader vehicle are used for the identification of the leader vehicle. Therefore, the predetermined number of measurements of GPS positioning coordinates may, be provided as "leader information" in claims.

Further, the number of order in the sub-convoy can be calculated by adding 1 to the currently-included number that is included, in the convoy travel information from the leader vehicle of the sub-convoy, which is received at a time of joining the sub-convoy. As provided earlier, the convoy travel information of the leader vehicle of the sub-convoy includes the currently-included number and the maximum allowable number, whereas the convoy travel information of the follower vehicle of the sub-convoy does not. Therefore, the currently-included number and the maximum allowable number may be used as the "leader information." Further, in SD5, the process also identifies the convoy travel information of an intermediate vehicle where the intermediate vehicle exists between the leader vehicle and the subject vehicle in the sub-convoy to which the subject vehicle belong as the following vehicle.

Based on the convoy travel information of the other vehicle in the sub-convoy identified in SD5, the process, in SD6, the contents of the convoy travel control of the subject vehicle, that is, the travel control for the subject vehicle in order to maintain the sub-convoy (e.g., speed control, steering control and the like), are determined. The process of SD6 is similar to the process performed in a publicly-known convoy travel control.

In SD7, the process determines whether there is room for a new vehicle in the allowable number of the sub-convoy in which the subject vehicle performs the convoy travel control as a following vehicle. Such determination is performed by comparing (i) the maximum allowable number included in the convoy travel information received from the leader vehicle of the sub-convoy with (ii) the currently-included number of vehicles. If the maximum allowable number is equal to the currently-included number, the process determines there is no room for a new vehicle (SD7, No), and proceeds to SD8. On the other hand, if the maximum allowable number is greater than the currently-included number, the process determines there is room for a new vehicle (SD7, Yes), and t proceeds to SD9.

In SD7, when the process determines there is no room for a new vehicle (SD7, No), the process proceeds to SD8 to determine whether the subject vehicle becomes a leader vehicle of the next sub-convoy. In the present embodiment, the sub-convoys are formed so that the leader vehicles of the sub-convoys are arranged in a successive manner. Therefore, the determination in SD8 will determine whether the subject vehicle is traveling right behind the leader vehicle in the sub-convoy in which the subject vehicle is traveling as a following vehicle. When the subject vehicle is not traveling right behind the leader vehicle of the sub-convoy, the process proceeds to SD9, and when it is traveling right behind the leader vehicle, the process proceeds to SD10.

In SD9, the process generates and transmits the convoy travel information of the subject vehicle. The convoy travel information generated in SD9 includes the whole convoy ID, the sub-convoy ID of the sub-convoy in which the subject vehicle is traveling as the following vehicle, and the travel information of the subject vehicle.

On the other hand, when SD10 is performed, the subject vehicle becomes the leader vehicle of a new sub-convoy. Therefore, in SD10, it generates a new sub-convoy ID. The convoy travel information generated in SD10 includes the convoy travel information generated in SD9 with added thereto (i) the generated sub-convoy ID, (ii) the maximum allowable number of the sub-convoy in which the subject vehicle serves as the leader vehicle, and (iii) the currently-included number of vehicle in such sub-convoy.

The currently-included number may be determined by counting the number of the convoy travel start notices, which are received while the subject vehicle is traveling as a following vehicle, or may be determined as the number of the follower vehicles in the process of SD5 for identifying the sender vehicle of the convoy travel.

When it is determined there is no room in the sub-convoy in SD7, a vehicle to be serving as the leader vehicle of the next sub-convoy performs SD10, thereby forming a new sub-convoy. In such manner, the rearmost sub-convoy in the whole convoy always has room for a new vehicle.

When either SD9 or SD10 is performed, the process proceeds to SD15, and performs the content determined in SD 6. The process proceeds to SD16 after performing SD15.

When the subject vehicle is a sub-convoy leader (SD3, Yes), the process continues to SD11 to receive the convoy travel information transmitted from other vehicles, which is similar to SD4. In SD12, which is similar to SD5, the process identifies the convoy travel information of the leader vehicle of the sub-convoy that is considered as a unit of convoy travel control by the subject vehicle, from among many sets of convoy travel information respectively received from multiple vehicles. Further, the process also identifies the convoy travel information of a vehicle which is detected as one between the leader vehicle and the subject vehicle in the sub-convoy where the subject vehicle is traveling as a following vehicle.

In SD13, based on the convoy travel information of the other vehicle in the sub-convoy identified in SD12, contents of the convoy travel, control of the subject vehicle are determined. The process of SD13 is the same as SD6, which is performed when the subject vehicle is a following vehicle of a sub-convoy. In other words, a leader vehicle of a sub-convoy may also determine the contents of the convoy travel control as a following vehicle of a preceding sub-convoy.

Further, the convoy travel information transmitted in SD14 is received at a time of execution of SD4 by the following vehicle(s) in the sub-convoy in which the subject vehicle is serving as a leader vehicle. Further, the following vehicle receiving the convoy travel information determines the contents of the convoy travel control based on the received convoy travel information. Therefore, the contents of the convoy travel control that is determined in SD6 by the following vehicle of the sub-convoy indirectly reflect the convoy travel information of the leader vehicle of the preceding sub-convoy.

In SD14, the process generates the convoy travel information. The generated convoy travel information includes the whole convoy ID, the sub-convoy ID of all sub-convoys to which the subject vehicle belongs, the currently-included number and the maximum allowable number of vehicles in the sub-convoy in which the subject vehicle serves as a leader vehicle, and the contents of, the convoy travel control determined in SD13, together with the convoy travel information of the initial state (State A).

The whole convoy ID and the sub-convoy ID of the sub-convoy in which the subject vehicle is traveling as a following vehicle are acquired from the convoy travel information transmitted from the leader vehicle of the sub-convoy. Further, the sub-convoy ID of the sub-convoy in which the subject vehicle serves as a leader vehicle is the one determined in SD10 at a time of determination that the subject vehicle will become a leader vehicle of a new sub-convoy. Further, the currently-included number may be determined by counting the number of the convoy travel start notices which are received after the subject vehicle has joined the convoy, or may be determined as the number of the follower vehicles in the process of SD12 for identifying the sender vehicle of the convoy travel identification.

Figure 9:
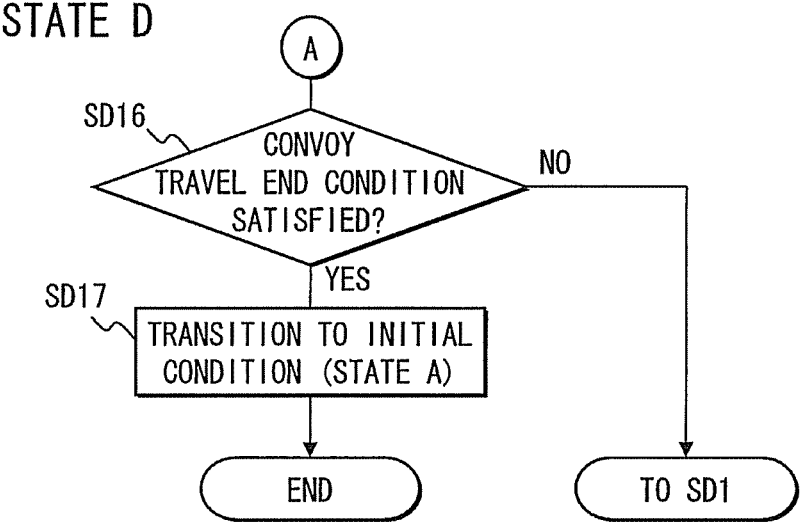
FIG. 9 is a continuation of the process of FIG. 8 performed in the convoy travel state (State D) by the convoy travel apparatus.

After performing SD14, the process proceeds to SD15, and performs the contents determined of SD13. The process then proceeds to SD16 of FIG. 9.

In SD16, it is determined whether a convoy travel end condition is satisfied. The convoy travel end condition may be, for example, an override operation performed by the driver, a move of the subject vehicle to another lane, an input operation indicating an intention of ending the convoy travel, or the like. The override operation is an operation by the driver operating the vehicle that generates a behavior that is in conflict with a behavior determined by an adaptively-following travel control of the vehicle. For example, when a behavior determined by the adaptively-following travel control of a vehicle is an acceleration of the vehicle, a braking operation by the driver would be an override operation.

If the determination in SD16 is negative, the process returns to SD1. On the other hand, the process proceeds to SD17 if the determination in SD16 is affirmative. Then, in SD17, the process changes the state parameter to the initial state (State A). In such case, the process in FIG. 3 is performed.

As described above, in the convoy travel in a convoy travel state (State D), the convoy travel information includes the whole convoy ID and the sub-convoy ID (SD2, SD9, SD10, SD14), utilizing the sub-convoy ID for performing the convoy travel control. Since the number of vehicle in the sub-convoy having a certain sub-convoy ID is equal to or smaller than the number of which is defined by the capacity of the wireless communication unit 11 of the leader of the sub-convoy, the followers in the sub-convoy can always receive the convoy travel information transmitted from the leader of the sub-convoy. Then, the followers in the sub-convoy respectively determine the contents of the convoy travel control based on the convoy travel information from the leader of the sub-convoy (SD6).

Further, in the present embodiment, the leader of each of the sub-convoys is successively arranged in a series. Therefore, the positions of such leaders come to the front part of the whole convoy. Therefore, the convoy travel information is quickly transmitted from the front part of the whole convoy to the followers in each of the sub-convoys.

Second Embodiment

The second embodiment, considers two whole convoys that are joined to form one whole convoy, where the two whole convoys are traveling in the same direction and are traveling close to each other while still be considered two separate whole convoys. A first whole convoy, which is provided as a forward whole, is traveling in front of a second whole convoy, which is provided as a following whole convoy.

When two whole convoys become one whole convoy, the leader of the following whole convoy determines whether such leader can join, as a follower vehicle, a sub-convoy in the forward whole convoy. Such determination is performed in the initial state (State A) of the above-mentioned embodiment, and such determination is performed based on the communication condition and the relative position coordinates.

Further, when the leader of the following whole convoy determines that it can join the sub-convoy of the forward whole convoy as the follower vehicle, the driver's intention and/or a predetermined condition such as the elapsed time and the inter-vehicle distance after such determination is further considered to determine whether to join the forward whole convoy.

Figure 8:
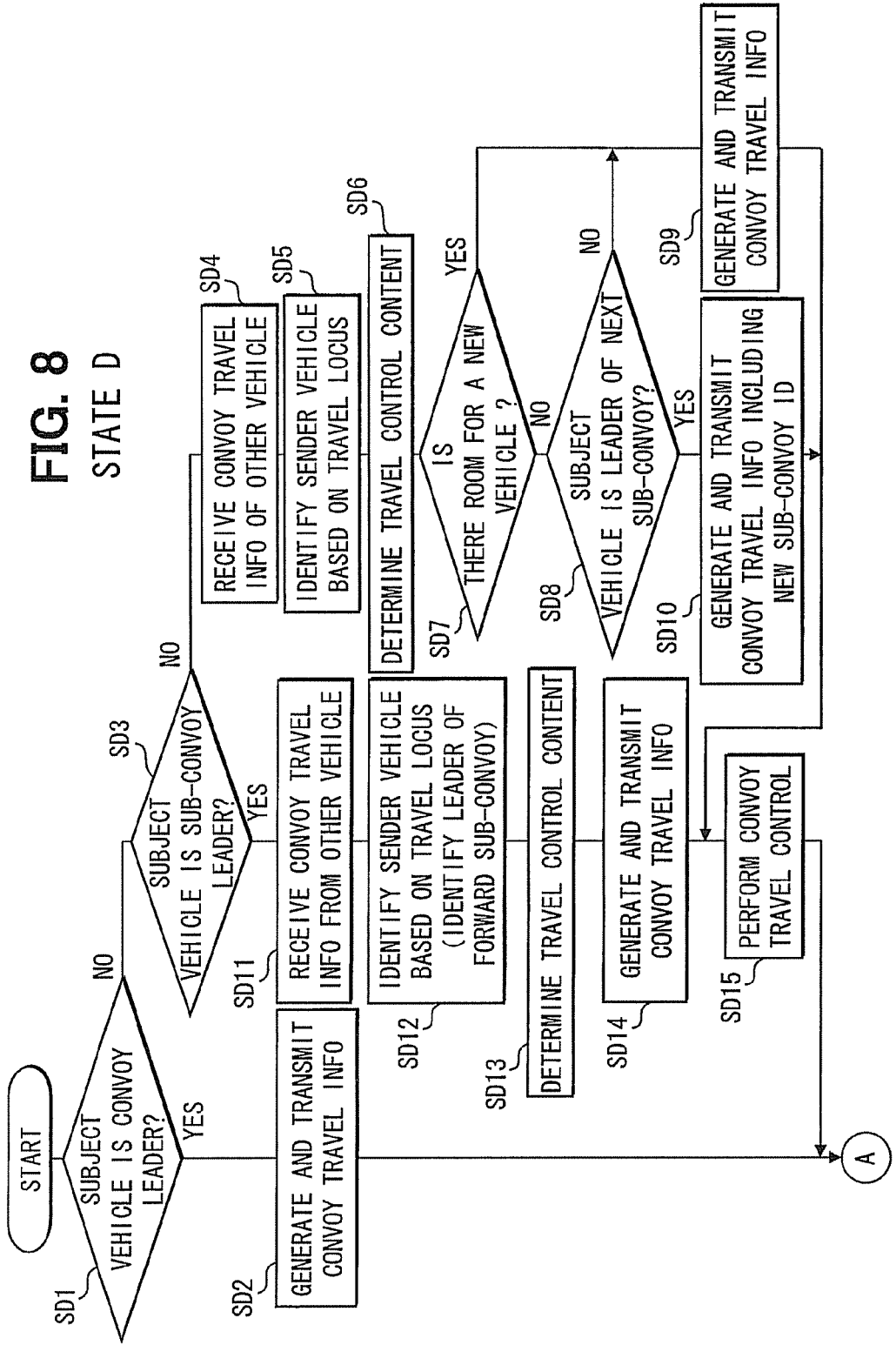
FIG. 8 is a flowchart of a process performed in the convoy travel state (State D) by the convoy travel apparatus.

If it is determined to join the forward whole convoy, the leader of the following whole convoy receives the whole convoy ID of the forward whole convoy and the sub-convoy IDs of the sub-convoys, and includes the IDs received in the convoy travel information transmitted in SD2 of FIG. 8. The whole convoy ID and the sub-convoy IDs of the forward whole convoy may be designated as, for example, connect IDs, for the clear distinction from the IDs of the following whole convoy. Further, the process for handling the convoy travel information from multiple sub-convoys in the forward whole convoy is the same process for handling only one whole convoy (i.e., SD5).

The convoy travel information is received by the follower vehicles of the leader vehicle of the following whole convoy. Therefore, the follower vehicles can recognize that they are now connected to a different whole convoy. Further, even in the following whole convoy, the followers close to the leader may be able to receive the convoy travel information from the leader(s) of the sub-convoy(s) of the forward whole convoy.

Before joining the two whole convoys, the followers of the leader of the following whole convoy do not use the information from different whole convoy even when such information is received. However, when the followers have already received the whole convoy ID and the sub-convoy IDs of the forward whole convoy from the leader of the following whole convoy, the followers utilize the convoy travel information of the forward whole convoy. More practically, the convoy travel information of the forward whole convoy including the whole convoy ID and the sub-convoy IDs are receivable from the leader of the sub-convoy of the forward whole convoy, such convoy travel information is newly used as the convoy travel information of the leader of the sub-convoy including the subject vehicle (i.e., the follower), for determining the content of the convoy travel control of the subject vehicle.

In such manner, the followers of the following whole convoy, is enabled to perform the convoy travel control based on the convoy travel information from the sub-convoy of the forward whole convoy.

Further, it may further be assumed, as a prerequisite for using the convoy travel information from the sub-convoy of the forward whole convoy, that the sub-convoy of the forward whole convoy has room for a new vehicle. Whether there is room in the sub-convoy may be determined in the same manner as SD7 of FIG. 9.

Based on the present disclosure, when an immediate front vehicle of the subject vehicle is serving as a sub-convoy leader vehicle of a sub-convoy in which the subject vehicle is traveling as a follower vehicle, the subject vehicle serves as a leader vehicle of a next sub-convoy. In such manner, the sub-convoy leader vehicles are arranged at a top of the whole convoy, thereby enabling a quick broadcast of information from the front portion of the whole convoy to the follower vehicles.

In addition, the subject vehicle may also serve as a sub-convoy leader vehicle of a next sub-convoy, when the subject vehicle is traveling in a sub-convoy as a follower vehicle at a rearmost position of the sub-convoy, which is defined by a communication capacity of the sub-convoy leader vehicle.

Further, regarding the process in the sub-convoy leader vehicle, when the subject vehicle is traveling in a sub-convoy as a follower vehicle and is positioned in an order of the sub-convoy to be serving as a sub-convoy leader vehicle of a next sub-convoy, the wireless communication unit of the subject vehicle transmits the convoy travel information that includes (i) a sub-convoy ID of the next sub-convoy in which the subject vehicle serves as the sub-convoy leader vehicle and (ii) capacity information of the next sub-convoy indicating a current allowable number of sub-convoy vehicles, after generation of the sub-convoy ID and the capacity information.

In such manner, a newly joining vehicle can determine if it could join the next sub-convoy, based on the capacity information. Further, based on the sub-convoy ID, the newly joining vehicle can determine which information to use for performing the convoy travel control.

Further, the capacity information indicating the current allowable number of vehicles may be directly indicating the number of vehicles currently allowable in the convoy, or may be indirectly indicating the number of vehicles as a difference between the maximum allowable number and a currently-included number. Further, the vehicle to be serving as a leader of the next sub-convoy may be a vehicle next to the leader vehicle of the sub-convoy when the immediate ahead vehicle is the leader of the sub-convoy to which the subject vehicle belongs ((CU case)), or may be the rearmost vehicle of the sub-convoy which is defined by the sub-convoy leader vehicle's communication capacity.

Further, when the convoy travel control is performed by using the sub-convoy ID, two whole convoys may be considered as one whole convoy in terms of convoy travel control.

When one whole convoy is organized for a convoy travel of vehicles, the whole convoy ID is transmitted by the convoy travel information. In such manner, when a second whole convoy is traveling in proximity of a first whole convoy, the convoy travel information of the second whole convoy may not be falsely used to control the first whole convoy. However, in a situation in which two convoys may well be organized as one, the whole convoy IDs respectively identifying the first whole convoy and the second whole convoy may prevent the unification of two convoys, where the second whole convoy is following the first whole convoy Since the leader of the second whole convoy determines by itself that it may join the sub-convoy of the first whole convoy as a follower, the leader of the second whole convoy may use the convoy travel information of the sub-convoy of the first whole convoy to perform the convoy travel control. However, for the follower vehicle(s) of the second whole convoy, which may receive the convoy travel information from the sub-convoy leader vehicle of the sub-convoy of the first whole convoy in addition from the leader of the second whole convoy, the follower vehicle(s) may not be able to determine which convoy travel information to use for performing the convoy travel control.

Therefore, when the subject vehicle is a leader of the second whole convoy and is joining, as a follower, a sub-convoy of the first whole convoy traveling in front of the subject vehicle, the subject vehicle receives the whole convoy ID and the sub-convoy ID of the first whole convoy, and transmits the convoy travel information including the whole convoy ID and sub-convoy ID received. The convoy travel information is received by the follower vehicle(s) of the second whole convoy.

Therefore, when the subject vehicle is a follower vehicle of the second whole convoy, and is receiving, from the leader of the second whole convoy, the convoy travel information including the whole convoy ID and the sub-convoy ID of the first whole convoy, and is also receiving, from the sub-convoy leader of he sub-convoy of the first whole convoy, the convoy travel information including the whole convoy. ID and the sub-convoy ID of the first whole convoy, the subject vehicle performs the convoy travel control by using the convoy travel information from the sub-convoy leader vehicle of the sub-convoy of the first whole convoy.

In such manner, even when the subject vehicle is a follower in the following whole convoy, the subject vehicle is enabled to perform the convoy travel control of itself, based on the convoy travel information of the sub-convoy of the forward sub-convoy.

Although the present disclosure has been fully described in connection with the present disclosure with reference to the accompanying drawings, it is to be noted that various changes and modifications will become apparent to those skilled in the art.

For instance, the successive arrangement of the leaders of the sub-convoys in the first embodiment may be changed, and the rearmost vehicle of a sub-convoy may be serving as a leader of the subsequent sub-convoy. In such case, the subject vehicle may determine if it is the rearmost vehicle of a sub-convoy as to determining that it can serve as a leader of the subsequent sub-convoy. Whether the subject vehicle is a rearmost vehicle of a sub-convoy may be determined based on whether the maximum allowable number and the currently-included number are equal to each other or not.

Such changes and modifications are to be understood as being within the scope of the present disclosure as defined by the appended claims.

What is claimed is:

1. A convoy travel apparatus installed in a subject vehicle, the apparatus comprising:
   a control unit generating convoy travel information and performing a convoy travel control of the subject vehicle; and a wireless communication unit performing vehicle-to-vehicle communication, the wireless communication unit regularly transmitting the convoy travel information of the subject vehicle generated by the control unit and regularly receiving convoy travel information from other vehicles, wherein the convoy travel information of the subject vehicle and of the other vehicles includes a whole convoy ID representing a whole convoy and at least one sub-convoy ID respectively representing a sub-convoy, the sub-convoy is organized by dividing the whole convoy, each sub-convoy including a number of vehicles less than or equal to a predetermined value defined by a communication capacity of the wireless communication unit of a sub-convoy leader vehicle, the control unit determines whether the subject vehicle is the sub-convoy leader vehicle or a sub-convoy follower vehicle of the sub-convoy, the control unit performs the convoy travel control of the subject vehicle per the convoy travel information received from the sub-convoy leader vehicle of the sub-convoy in which the subject vehicle is traveling as the sub-convoy follower vehicle, when the subject vehicle is the sub-convoy follower vehicle of the sub-convoy and based on the sub-convoy ID and leader information included in the convoy travel information, the control unit identifies the convoy travel information from the sub-convoy leader, the control unit generates the convoy travel information to further include the leader information for identifying the subject vehicle as a leader of the sub-convoy, when the subject vehicle is the sub-convoy leader vehicle of the sub-convoy, and the control unit (a) based on the sub-convoy ID and the leader information included in the convoy travel information, identifies the convoy travel information received from the sub-convoy leader vehicle of the sub-convoy in which the subject vehicle is traveling as the sub-convoy follower vehicle, (b) determines a content of the convoy travel control of the subject vehicle based on the convoy travel information identified, and (c) generates the convoy travel information to further include the content of the convoy travel control, when the subject vehicle is the sub-convoy leader vehicle of a subsequent sub-convoy to a forward sub-convoy.

2. The convoy travel apparatus of claim 1, wherein the control unit determines that the subject vehicle is the sub-convoy leader vehicle of a next sub-convoy, when an immediate front vehicle of the subject vehicle is serving as the sub-convoy leader vehicle of the sub-convoy in which the subject vehicle is traveling as the sub-convoy follower vehicle.

3. The convoy travel apparatus of claim 1, wherein the control unit determines that the subject vehicle is the sub-convoy leader vehicle of a next sub-convoy, when the subject vehicle is traveling in the sub-convoy as the sub-convoy follower vehicle at a rearmost position of the sub-convoy having a communication capacity defined by the sub-convoy leader vehicle.

4. The convoy travel apparatus of claim 1, wherein the control unit generates the convoy travel information to further include (i) a sub-convoy ID of a next sub-convoy in which the subject vehicle serves as the sub-convoy leader vehicle and (ii) capacity information of the next sub-convoy indicating a current allowable number of sub-convoy follower vehicles, when the subject vehicle is traveling in the sub-convoy as a follower vehicle and is positioned in an order of the sub-convoy to be serving as the sub-convoy leader vehicle of the next sub-convoy.

5. The convoy travel apparatus of claim 1, wherein
when the subject vehicle is a leader in the whole convoy and is joining, as a sub-convoy follower vehicle, a sub-convoy of a forward whole convoy traveling in front of the subject vehicle, the wireless communication unit of the subject vehicle receives the whole convoy ID and the sub-convoy ID of the forward whole convoy, and the control unit generates the convoy travel information to further include the whole convoy ID and sub-convoy ID of the forward whole convoy, and
when the subject vehicle is a follower of the whole convoy, and receives, via the wireless communication unit, from the leader of the whole convoy, the convoy travel information that includes the whole convoy ID and the sub-convoy ID of the forward whole convoy, and receives from the sub-convoy leader vehicle of the sub-convoy of the forward whole convoy the convoy travel information that includes the whole convoy ID and the sub-convoy ID of the forward whole convoy, the control unit of the subject vehicle performs the convoy travel control of the subject vehicle based on the convoy travel information from the sub-convoy leader vehicle of the sub-convoy of the forward whole convoy.

6. The convoy travel apparatus of claim 1, wherein the whole convoy includes a plurality of vehicles, the at least one sub-convoy ID includes a plurality of sub-convoy IDs representing a plurality of sub-convoys, respectively and each of the plurality of sub-convoys includes a plurality of vehicles.

* * * * *